Nov. 3, 1936.　　　B. W. HENNING　　　2,059,578
METHOD OF AND APPARATUS FOR FORMING SPIRAL PIPES
Filed March 28, 1932　　5 Sheets-Sheet 1

FIG_1A_

INVENTOR.
Bruno W. Henning
BY
ATTORNEYS.

Patented Nov. 3, 1936

2,059,578

UNITED STATES PATENT OFFICE 2,059,578

METHOD OF AND APPARATUS FOR FORMING SPIRAL PIPES

Bruno W. Henning, San Francisco, Calif.

Application March 28, 1932, Serial No. 601,622

14 Claims. (Cl. 153—54)

My invention relates to a method of and apparatus for manufacturing pipe and is particularly directed to the manufacture of pipe having a spiral seam.

It is one object of my invention to provide apparatus for forming spiral pipe in variable lengths, the force required for the operation of the forming rolls being independent of the length of the pipe.

Another object is to provide apparatus for forming spiral pipes in which the force involved is reduced to that required to roll a small portion of the material to the diameter of the finished pipe, thereby enabling the manufacture of spiral pipes in variable lengths, of any diameter, of any wall thickness and of any material which can be rolled to assume the cylindrical shape desired.

Another object is to provide novel rollers in pipe forming apparatus of the character described.

Still another object is to provide a novel mandrel in pipe forming apparatus of the above character.

Another object is to provide means for moving the formed pipe relative to the rollers in a direction parallel to the axes of rotation of the rollers, whereby the pipe is continuously fed from the rollers as it is formed, and means for tightening the turns of the spiral and precluding the same from unwinding in the portion of the spiral form which has left the rollers.

Still another object is to devise a novel method for forming spiral pipes.

These and other objects and advantages are attained in the embodiment of my invention illustrated in the accompanying drawings, in which:

Figures 1a and 1b, when placed side by side, constitute a plan view of a machine incorporating the principles of the invention.

Figure 2 is a cross sectional view taken along the plane indicated by line 2—2 of Figure 1a.

In the preferred form of my invention a plurality of rollers is provided for winding a sheet of material about a central mandrel so that the material takes the form of a spiral with the longitudinal edges of the sheet in proximity between successive turns of the spiral. Preferably, the rolling surface of each of the rollers is interrupted and is provided with one or more depressions extending longitudinally of the corresponding roller. When a depression is disposed adjacent the material being rolled, the pressure on the material is relieved and means is provided for feeding the material and the portion of the spiral theretofore formed in a direction parallel with the axis of the mandrel. Thereafter another increment of the spiral is formed and means is provided for feeding the material in a direction at right angles to the axis of the mandrel to supply sufficient material to enter into the manufacture of the spiral. When the pressure is again relieved at the rollers, the material is fed parallel to the axis of the mandrel and so on, the material being fed into the rollers at right angles and then longitudinally along the rollers, alternately, until the desired length of pipe is obtained. The rollers need only be sufficiently long to roll a single one of these small increments of the pipe, since the formed pipe is moved longitudinally off the rollers after each rolling operation by a distance corresponding to the length of pipe formed in each preceding rolling operation. By changing the effective extent of the rolling surface between depressions, the increment of the pipe formed in a single rolling operation can be made as small as desired, thereby reducing the required length of the rollers to a very small value, as compared with previous constructions. Rollers having a length slightly greater than the pitch of the spiral being formed but not greater than twice the pitch will ordinarily be adequate, but for obvious reasons, a reasonable amount of surplus length at each end of the rollers is desirable.

Preferably, one end of the mandrel is not supported so that the formed pipe can be fed from the machine at that end. During the operation of the machine the pipe material interposed between the mandrel and the rollers keeps the mandrel centralized with respect to the rolling surfaces of the various rollers. Since the pipe is released at the end of each rolling operation and since all material suitable for forming pipe has at least some resiliency, there will be little or no gripping of the mandrel by the material when the pressure is relieved and only sufficient force need be applied to slide the pipe material forward.

After the formed portion of the pipe emerges from the rollers, no further force is exerted thereon, of course, by the rollers, and for this reason only sufficient force need be applied by the rollers to form the increment of the pipe between them at the time.

Also, any material that can be rolled by the rollers can be moved longitudinally thereof when the pressure of the rollers is relieved and for this reason a pipe of small diameter, with thick walls and of tough material, can be made in variable lengths, providing the material will withstand the rolling operation and providing sufficient force is applied by the rollers to form a single increment of the pipe.

Preferably, means is provided for receiving and supporting the formed portion of the pipe as it is expelled from the forming rollers, and if desired, the supporting means can include means for exerting the torsional force on the pipe in a direction which tends to tighten the turns of the spiral, thus precluding undue separation of the turns of the spiral and facilitating welding of the seam, when the welding operation is to be performed as the spiral is fed from the forming rollers.

Referring now to the drawings, I have shown a plurality of forming rollers 16, 17, 18 and 19 mounted in suitable bearings for rotation about their respective longitudinal axes. Although four of these rollers have been shown in the embodiment of the invention illustrated, it is to be understood that any other number of rollers can be employed. The rollers 16 to 19 are disposed about a central mandrel 21 and serve to roll a sheet of material from which the pipe is to be made spirally about the mandrel. Preferably, the mandrel 21 is mounted for idle rotation, while the rollers 16 to 19 are all positively driven at substantially the same circumferential velocity.

The sheet of material 22 from which the pipe is to be made is fed between one of the rollers and the mandrel 21 and in the drawings the sheet is shown as being fed between roller 16 and the mandrel. As the roller 16 rotates, the sheet 22 is drawn into the machine and is passed between roller 17 and the mandrel and then beneath rollers 18 and 19 in succession. The angle at which the sheet of material is fed into the machine corresponds to the pitch angle of the spiral pipe to be formed.

Any suitable means can be provided for driving the rollers 16 to 19 in unison and in the embodiment illustrated I have shown a pulley 23 adapted to be driven by any suitable source of power, such as an electric motor or the like. Fixed to the shaft 24 of the pulley 23 is a bevel gear 26 which meshes with a bevel gear 27 mounted on a shaft 28 at right angles to the shaft 24. Secured to shaft 28 is a gear 29 which serves to drive a plurality of gears 31. The shaft of each of the gears 31 is connected, as by means of a universal coupling shaft 32, to one end of one of the forming rollers 16 to 19, thereby transmitting the motion of gears 31 to the forming rollers. The bearings of the forming rollers 16 to 19 are made adjustable in any suitable manner to enable adjustment of the rollers 16 to 19 to and from the mandrel 21, thereby providing for the manufacture of pipe of different diameters and of different thicknesses. Each of the universal transmission shafts 32 can be made adjustable as to length, as represented by the slot 33, to follow the adjustments of the forming rollers.

Figure 5:
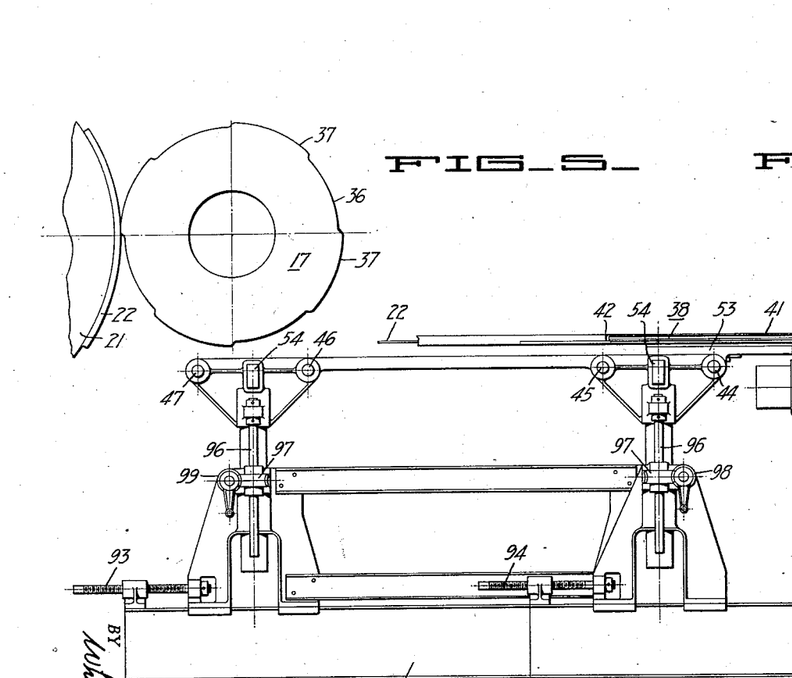
Figure 5 is a detail view illustrating the shape of certain forming rollers employed in the machine.

As illustrated in Figure 5, the rolling surface of each of the rollers 16 to 19 is interrupted by one or more depressions 36 extending longitudinally throughout the entire effective portion of the rollers. The high portions 37 of the rollers serve to shape the pipe material in the form of a spiral about the central mandrel 21, but when one of the depressions 36 on each of the rollers is adjacent the material, the pressure on the material is relieved and the inherent resiliency of the material causes the same to spring away from the mandrel. Thus, the material is free to be moved in a direction parallel to the axis of the mandrel during the interval that the depressions are adjacent the material. The pressure against the material being relieved at that time, rolling of the material in the form of a spiral is interrupted until another high portion 37 on each of the rollers bears against the material. Means is provided for moving the material longitudinally of the mandrel during the interval that the pressure is released, so that during operation of the apparatus, an increment of the pipe is formed and then moved forwardly toward one end of the mandrel, then another increment of the pipe is formed and thereafter moved forward, and so on, the pipe being formed in relatively small increments and the apparatus being cleared of the formed portion of the pipe as fast as the pipe takes shape. Obviously, variable lengths of pipe can be made in a single piece in this manner, since the force that the rollers are called upon to exert is determined by that required to shape a single increment of the pipe, and is independent of the length of the finished pipe.

For guiding and feeding the sheet material 22 into the shaping rollers 16 to 19 and for moving the formed pipe longitudinally of the mandrel 21, a pair of adjustable guide members 38 and 39 are provided. Extending between guide members 38 and 39 are a pair of guide channels 41 and 42 in which the edges of the sheet material 22 are disposed as the material passes into the forming rollers. Guide member 39 is supported by a carriage 43 mounted for sliding movement parallel to the axes of the rollers 16 to 19 along tracks or bars 44 and 45 at one end of the carriage and bars 46 and 47 at the other end of the carriage. The guide member 39 is pivotally mounted for angular adjustment relative to the carriage, as at 48. For enabling adjustments of the guide member 39 in a lateral direction, a screw or worm 49 is provided which engages a cooperating bracket 51 extending from a laterally movable portion of the carriage 43. A hand wheel 52 can be provided for turning the screw 49 to secure the desired lateral adjustment of the guide member 39 relative to the guide member 38 and by actuating the hand wheel 52 the angle at which the material is fed between the shaping rollers can be adjusted to any desired value within the limits of the adjusting means.

The guide member 38 can have a construction similar to that described for guide member 39, but in order to simplify the apparatus I have shown the guide member 38 supported for pivotal adjustment on a carriage 53 which is slidable along the bars 44 and 45. The guide member 38 can be provided with lateral adjusting means if desired, but ordinarily lateral adjustment of the other guide member 39 will suffice to give the desired range of feeding angles. A bar 54 extends between the carriages 43 and 53 and one end of the bar can be secured to carriage 43 while the carriage 53 is adjustably secured to the bar 54, as by means of a set screw 56. The bar 54 serves to interconnect the two carriages so they will slide in unison along their respective supporting bars, thereby maintaining the angle at which the material 22 is fed into the rollers at a constant value.

Figure 1A:
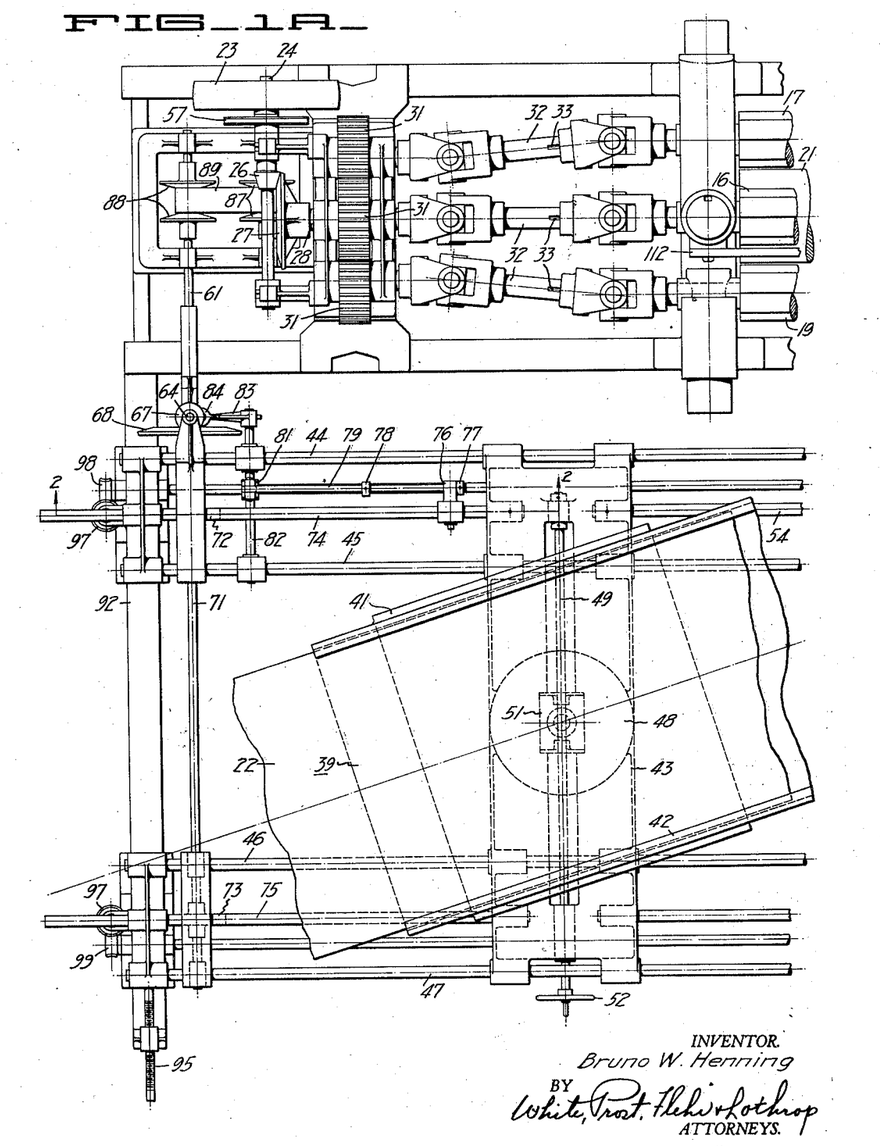
Figures 1B, 2:
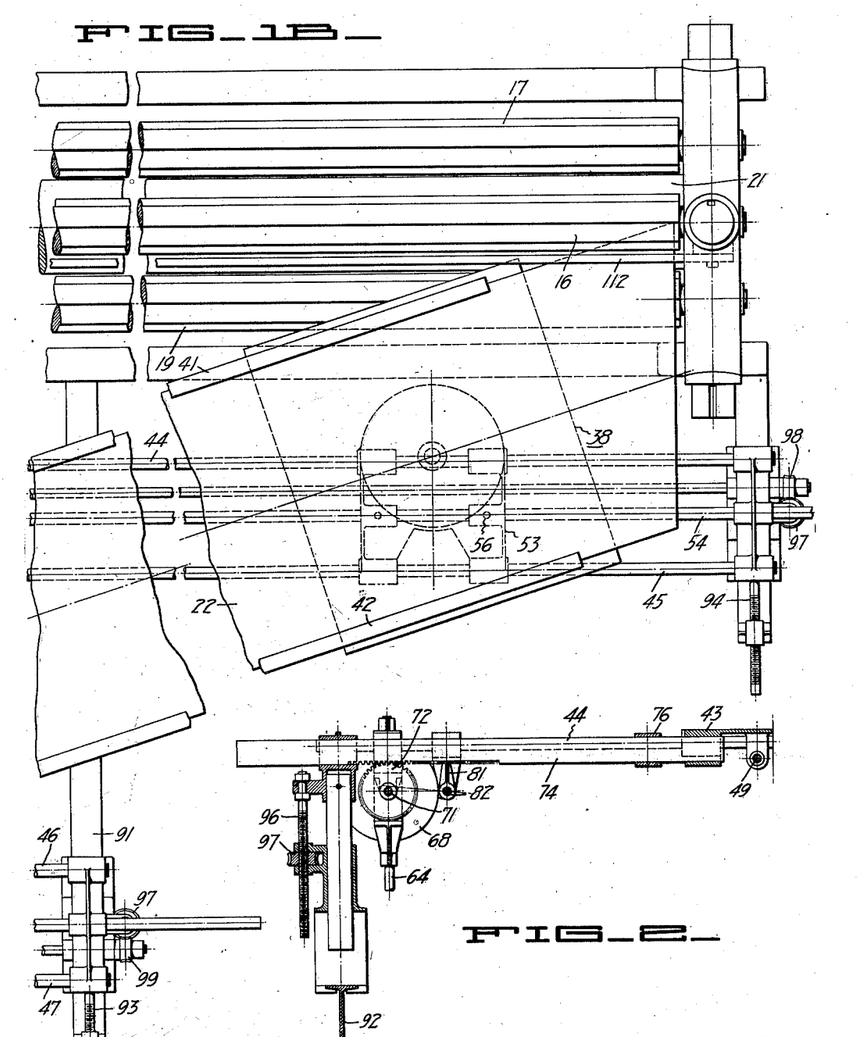
Figure 3:
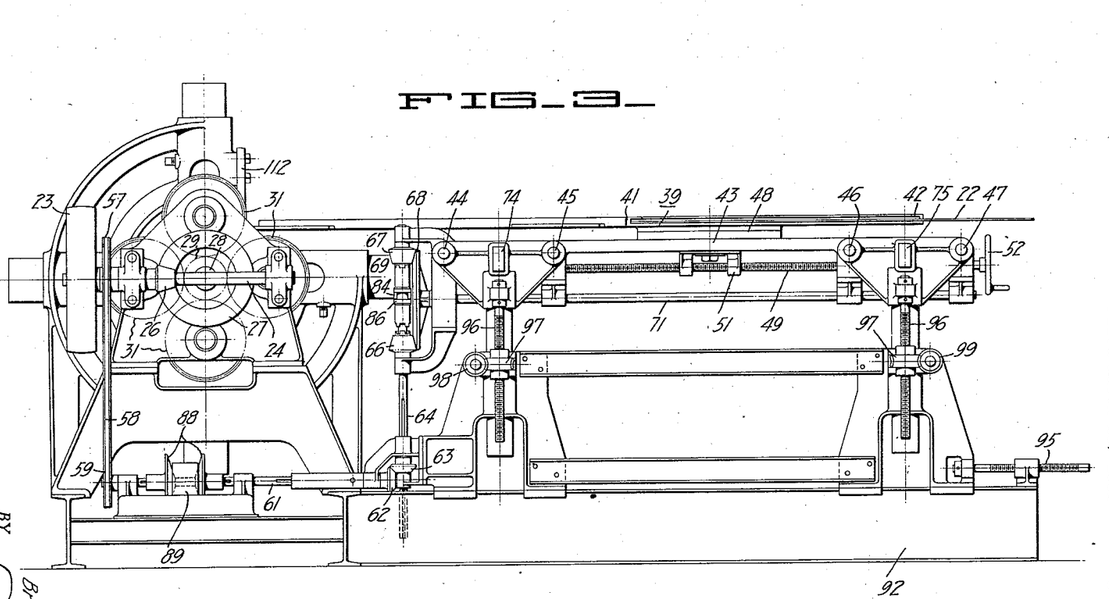
Figure 3 is a rear end elevational view of the machine.

As the material 22 is drawn into the rollers, the carriages 43 and 53 are moved along their respective tracks toward the left, as viewed in Figures 1a and 1b. During this step in the operation of the apparatus, the material is fed in a direction at right angles to the axis of the mandrel 21 and the rate of movement of the carriages 43 and 53 is proportional to the rate at which the material is drawn into the rollers, and is determined by the angle at which the longitudinal edge of the material is disposed relative to the rollers. In other words, the carriages 43 and 53 must move backwardly at a rate which is sufficient to clear the path of the material as it is being drawn into the rollers, but at no greater rate. If the rate of movement of the carriages is either too large or too small, there would be possible cramping of the parts and an error may appear in the pitch angle of the spiral being formed.

When the movement of the material 22 into the rollers ceases, that is, when one of the depressions 36 on each of the forming rollers is disposed adjacent the material, the carriages 43 and 53 are moved forwardly or to the right, as viewed in Figures 1a and 1b. During this movement of the carriages 43 and 53, the material 22 is moved parallel to the axis of the mandrel 21 and the portion of the spiral which was theretofore formed is moved a corresponding distance forwardly along the mandrel. When the succeeding high portion 37 of the forming rollers engages the material, the forward movement of the material ceases and the carriages are again moved backwardly to enable movement of the material into the rollers at right angles.

For effecting this reciprocating movement of the carriages 43 and 53 in synchronism with the rotation of the forming rollers 16 to 19 and at the desired rate, a sprocket 57 is secured to the shaft 24 of the drive pulley 23 and a chain 58 passing over this sprocket 57 serves to drive a sprocket 59. Between the shaft of sprocket 59 and a shaft 61, a variable friction drive mechanism can be interposed, this drive mechanism being represented by conical pulleys 87 and 88 shown interconnected by a suitable belt 89. Any other suitable variable feed mechanism can be employed for rotating the shaft 61 at the desired rate, but if a friction drive of this character is employed rather than a positive drive, certain discrepancies in the feed adjustment can be permitted without injuring the apparatus, since the drive will slip before any of the more rugged parts of the apparatus will yield. Shaft 61 carries a bevel gear 62 which meshes with a gear 63 on a vertical shaft 64. Gear 63 is preferably splined to the shaft 64 to permit certain height adjustments of the sheet guiding means relative to the forming rollers. Loosely disposed upon the shaft 64 are a pair of bevel pinions 66 and 67 both meshing with a bevel gear 68. Rotating with shaft 64 and disposed between the pinions 66 and 67 is a clutch member 69 having a clutch surface at each end thereof adapted to engage a cooperating clutch surface on one or the other of pinions 66 or 67.

Shaft 64 and member 69 thereon rotate in one direction at all times, but when the member 69 is in engagement with the pinion 67, the gear 68 rotates in one direction, and when it is in engagement with the pinion 66, the gear 68 rotates in the opposite direction. Thus, the gear 68 and the shaft 71 on which it is mounted can be made to rotate in either direction by moving the member 69 to engage the proper pinion. It is to be understood, however, that any other suitable reversing mechanism can be employed in place of the particular form chosen for illustration.

Mounted on shaft 71 are a pair of gears 72 and 73, the gear 72 being shown in Figure 2, which meshes with racks 74 and 75, respectively. One end of each of the racks 74 and 75 is secured to the carriage 43 of guide member 39 and as the shaft 71 is rotated, the racks are moved longitudinally to move the carriage 43 and also the carriage 53 in one direction or the other along the tracks or bars 44 to 47. For automatically reversing the direction of movement of the carriages 43 and 53, an adjustable stop 76 is secured to rack 74 which is adapted to strike against adjustable abutments 77 and 78 carried upon a longitudinally movable rod 79. One end of rod 79 is pivotally connected to the free end of a lever 81 secured to a rockable shaft 82. A lever 83 mounted on shaft 82 has a bifurcated end 84 which engages a collar 86 on member 69 to move the member 69 up or down in accordance with the movement of the rod 79, thereby reversing the direction in which the carriages 43 and 53 are driven whenever the abutments 77 and 78 are engaged. The parts are so arranged and adjusted that when the high portions of the forming rollers are in engagement with the sheet of pipe material, the carriages 43 and 53 are moved backwardly at the proper rate to allow the feeding of the material, and when the pressure on the material is relieved at the beginning of a set of depressions 36, the stop 76 strikes abutment 78 to reverse the drive and cause the carriages 43 and 53 to move forwardly, carrying the pipe material along the mandrel 21. Just at the instant the succeeding high portion on the forming rollers is about to engage the material, the stop 76 strikes abutment 79, so that when the pipe material is again grasped by the forming rollers, the carriages 43 and 53 begin their backward movement. Thus, the guiding and feed mechanism for the pipe material reciprocates in synchronism with the rotation of forming rollers at all times.

It may be mentioned at this time that any possible error in the angle at which the sheet material is fed into the forming rollers is not cumulative, since the apparatus virtually begins anew each time the material is relieved at the rollers. A slight error in the calculation of the angle or in the adjustment of the apparatus can be tolerated, therefore, without appreciably affecting the characteristics of the finished pipe. Heretofore, no error in the angle was permitted since any error was cumulative, that is, at the end of the second turn of the spiral, the error became twice as great as it was at the end of the first turn, and at the end of five turns, for example, the error became five times as great, and so on, the error increasing directly in accordance with the length of the pipe.

For adjusting the sheet guiding apparatus laterally relative to the forming rollers, the supporting frame thereof can be slidably mounted on tracks 91 and 92 and adjusting screws 93, 94 and 95 can be provided for adjustably positioning the frame laterally upon the track. Adjusting screws 96 can also be provided for enabling adjustment of the guiding apparatus as to height. In the embodiment illustrated, each of the adjusting screws 96 has associated therewith an actuating nut 97 which can be turned by means of one of the worms 98 or 99. Thus, the sheet guiding apparatus can be adjusted laterally and vertically relative to the forming rollers, in addition to the adjustment heretofore described which is provided for adjusting the angle at which the material is fed into the rollers.

Figure 6:
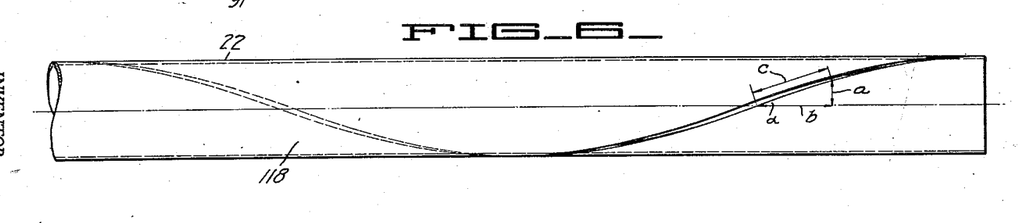
Figure 6 is a side elevational view of a section of spiral pipe.
Figure 11:
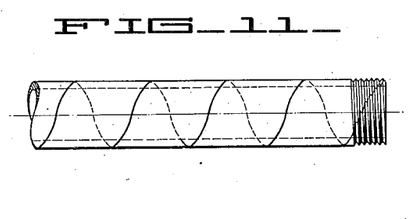
Figure 11 illustrates a spiral pipe having a right hand thread formed thereon, the spiral seam of the pipe being left handed.

In Figure 6 I have illustrated a section of pipe drawn to substantially the same scale as Figures 1a and 1b and having the approximate dimensions of the pipe which would be formed by the apparatus, when it is adjusted as shown in the drawings. It will be noted that the spiral is left-handed; that is, it turns in a counter-clockwise direction from either end of the pipe. Heretofore, as far as I am aware, spiral pipes have always been made right-handed. With my apparatus, spiral pipes can be made in relatively small diameters and with walls which are sufficiently thick to have a thread cut therein. In forming a right-hand thread on a pipe, a torsional force is applied which is such that it tends to loosen a right-hand spiral and which tends to tighten a left-hand spiral, and for this reason I prefer to manufacture pipes having a left-hand spiral. In Figure 11 a left-hand spiral pipe is shown having a right-hand thread formed thereon which clearly illustrates this feature.

Figure 7:
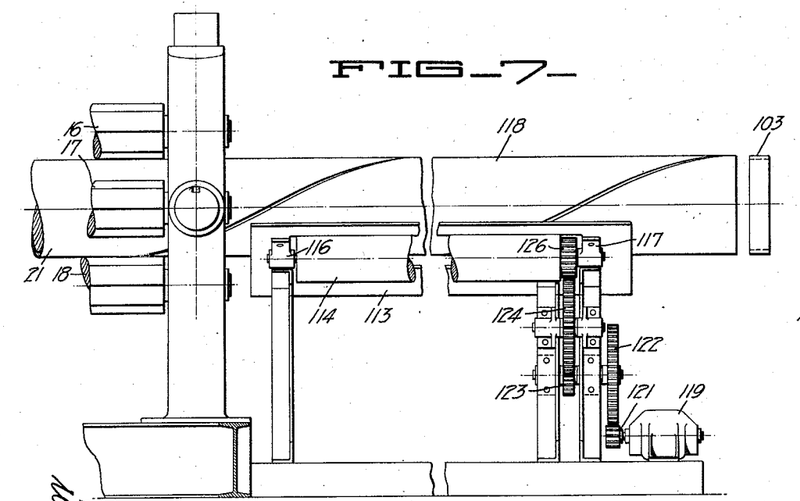
Figure 7 is a side elevational view of a support for tightening the turns of the spiral as it is fed from the shaping rollers.

The right-hand end of the mandrel 21, as viewed in Figure 1b, is free and unsupported in any bearing, so that as the formed spiral is moved longitudinally of the mandrel, it can emerge from the forming rollers over this end of the mandrel, as shown in Figure 7. The left-hand end of the mandrel 21, however, is journaled in any suitable manner in a bearing which maintains this end of the mandrel equi-distant from the rolling surfaces of the forming rollers 16 to 19 and suitable means can be provided at the bearing for precluding longitudinal movement of the mandrel. To facilitate replacement of the rolling surface of the mandrel 21 and to enable the use of mandrels of different diameters without dismantling the apparatus, I prefer to provide a central core 101 about which a cylindrical shell 102 of any desired outside diameter can be disposed. The shell 102 is removably secured to the core 101 in any suitable manner and when it is desired to vary the effective diameter of the mandrel 21, all that is necessary is to remove the shell 102 from the core and substitute therefor a shell having the desired dimensions.

When the sheet material is being rolled about the mandrel, the free end of the mandrel is kept centralized between the forming rollers by the material itself, but in order to hold the free end of the mandrel central with respect to the rollers during the initiation of the rolling operation, a collar or ring 103 can be slipped over the end of the mandrel to properly space the same from the forming rollers. As the spiral takes shape and as the material is moved longitudinally of the mandrel, the collar 103 will be gradually pushed off the mandrel by the advancing end of the formed spiral. Such an arrangement, however, necessitates the use of collars 103 of different sizes for pipes of different dimensions and where this is objectionable, a temporary bearing, such as that shown in Figures 9 and 10, can be employed instead to centralize the mandrel during the starting operation.

Figures 9, 10:
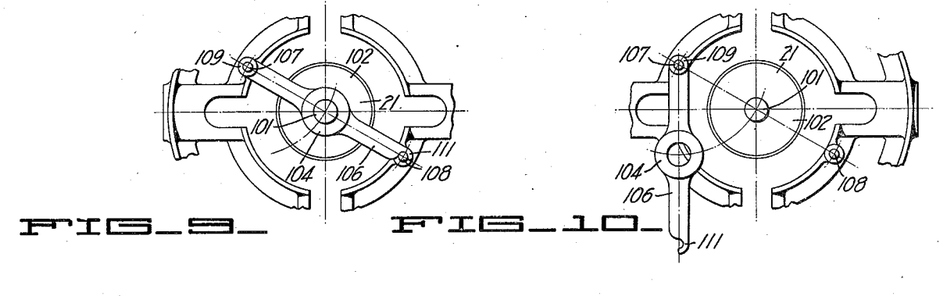
Figures 9 and 10 are detail views illustrating a temporary centralizing support for one end of the mandrel of the machine illustrated in Figures 1a and 1b.

In the arrangement illustrated in Figures 9 and 10, the central supporting core 101 of the mandrel is made to project slightly beyond the end of shell 102. The projecting end of core 101 can be journaled in a bearing 104 carried by a cross bar 106. Cross bar 106 is mounted for sliding movement in a direction parallel with the axis of the mandrel 21 upon rods 107 and 108. Thus, the end 109 of the cross bar 106 is pivoted at the rod 107 to enable swinging movement of the cross bar about the rod 107 and sliding movement along the rod. The other end 111 of the cross bar 106 is supported for sliding movement along the rod 108. The rod 108 is shorter than the rod 107, so that when the cross arm 106 is moved along the rods 107 and 108 by the advancing end of the spiral being formed, the end 111 of the cross bar reaches the end of rod 108 and swings downwardly about the rod 107 to the position shown in Figure 10. Thus, the temporary bearing 104 is automatically moved to a non-interfering position when it is no longer needed to support the free end of the mandrel.

Figure 4:
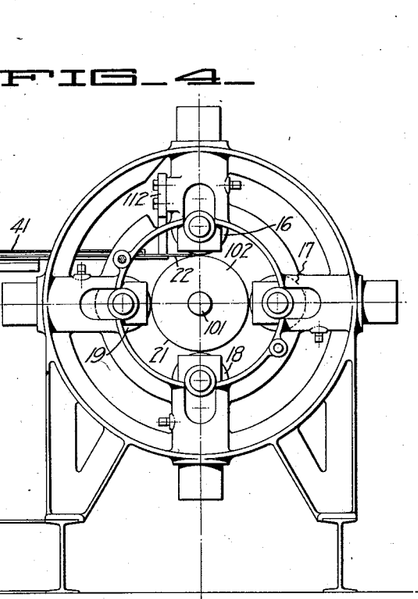
Figure 4 is a front end elevational view of the machine.

To aid in ironing out possible irregularities in the sheet material and to maintain the surface thereof flat as it enters the forming rollers, a straight edge member 112 is provided which bears against the upper surface of the material, as shown in Figure 4. It has been found that when such a member is employed, the abutting edges of the spiral seam are more regular in the formed pipe, and welding of the seam is facilitated. Also, the straight edge member 112 serves to relieve certain forces which would otherwise be exerted against the sheet guiding means and which would have a tendency to disturb the functioning of the guiding apparatus. Any suitable means can be provided for adjusting the straight edge member 112 to afford accommodation for pipes and sheet material of different dimensions.

Figure 8:
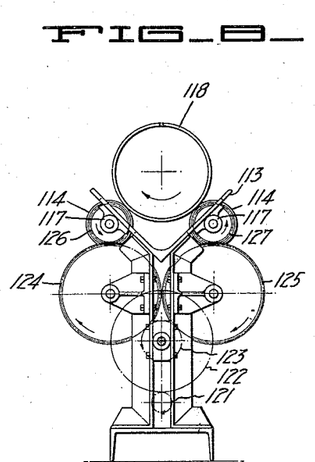
Figure 8 is an end elevational view of the support shown in Figure 7.

As the formed pipe emerges from the forming rollers, it is projected upon a support and means can be provided, if desired, for exerting a torsional force upon the spiral which tends to tighten the turns of the spiral. As shown in Figures 7 and 8, the support can have the form of a trough 113. One or more rollers 114 (two being shown in the embodiment illustrated) can be journaled in bearings 116 and 117 in a position such that the surfaces of the rollers 114 frictionally engage the surface of the spiral form 118 upon the support. An electric motor 119 can be provided for rotating the rollers 114 in the proper direction and at a peripheral velocity which is slightly greater than the peripheral velocity of the spiral form 118, whereby a continuous force is applied to the spiral which tends to tighten the turns thereof. A suitable gear train, comprising a series of gears 121 to 127 can be employed between the motor 119 and the rollers 114 for obtaining the desired rate of rotation of the rollers 114. By providing rollers 114 or equivalent means for applying a torsional force to the pipe in this manner, unwinding of the turns of the spiral is precluded and, if desired, the torsional force can be made sufficiently great to bring the edges of the spiral seam into a close abutment at a definite point to facilitate welding of the seam at that point, in the event that it is desired to weld the seam as the pipe emerges from the forming rollers. Whether the welding operation is to be performed as the pipe emerges or whether it is to be performed at a later stage, however, it is desirable to maintain the shape of the spiral by some such means, especially where the pipe is of large diameter and has relatively thin walls. Where the pipe is of small diameter and has relatively thick walls, thereby providing a spiral form which is rugged, and if the welding operation is to be performed at a later stage, the application of a torsional force to the spiral form as it emerges becomes of relatively less importance. Since the rollers 114 operate somewhat faster than the peripheral velocity of the pipe, they exert, through friction only, a force tending to keep the pipe wound; but since these rollers are primarily supports, as distinguished from clamps, they do not materially preclude the axial movement of the formed pipe. While they offer some frictional resistance to movement, the resistance is not large in comparison with the remainder of the forces exerted in the structure, and in practice is not a deleterious factor or even a serious problem.

From the foregoing description, the operation of the apparatus will be readily understood. The material 22 of which the pipe is to be made is directed into the forming rollers 16 to 19 at the desired angle, the angle which the longitudinal edge of the sheet makes with the forming rollers corresponding to the pitch angle of the spiral. When a high portion of the rollers 16 to 19 engages the sheet, the sheet is drawn into the rollers at right angles to the axes of rotation of the rollers for a distance corresponding to the arcuate width of the contacting high portions of the rollers. If this distance is equal to the distance $a$ indicated in Figure 6, the length of the spiral seam in the increment of the pipe formed will be equal to $c$, and the length of the increment will be equal to $b$. While the sheet material is being drawn into the rollers for the distance $a$, the guiding members 38 and 39 recede at a constant rate for the distance $b$, thereby enabling feeding of the material laterally into the rollers without cramping of the parts. At the termination of this rolling step, the pressure on the material is relieved by reason of the depressions in the rollers and simultaneously the guide members 38 and 39 are moved forwardly or to the right, as viewed in Figures 1a and 1b, for a distance equal to the distance $b$ and the sheet material 22 as well as the portion of the pipe that was theretofore formed is moved longitudinally of the mandrel by the guide members. Thereafter, another increment of the pipe is formed by drawing the material laterally into the rollers for a distance $a$ and then moving the same longitudinally for a distance $b$. Thus, the sheet material is fed first into the rollers at right angles thereto and then parallel to the axes of the rollers alternately. The distance $a$ by which the material is fed at right angles to the roller is determined by the effective arcuate width of the high portions 37 on the forming rollers. The length $c$ of the seam and the distance $b$ of the longitudinal movement are proportional to the distance $a$ and are determined by the pitch angle $\alpha$ of the spiral. The distance $a$, for example, is equal to the sine of the angle $\alpha$ multiplied by the length $c$ of the seam. It will be understood that the increment of the pipe which is made in a single rolling operation can be made as small as desired by reducing the distance $a$ or, in other words, by making the respective widths of the high portions of the forming rollers smaller.

While I have shown and described a preferred form of my invention, it is to be understood that the invention, as defined in the appended claims, can be embodied in a plurality of other forms.

I claim:

1. In a machine for forming pipe, a mandrel, a plurality of rollers cooperating with said mandrel to roll a sheet into the form of a pipe having a spiral seam, the rolling surface of each of said rollers having a depression therein for relieving the pressure exerted upon said sheet at predetermined intervals, the depressions on all of said rollers being so disposed that the pressure is relieved at all of said rollers at the same time, and means for feeding said sheet longitudinally of the mandrel whenever the pressure on the sheet is relieved at the rollers.

2. In a machine for forming pipe, a mandrel, a plurality of rollers cooperating with said mandrel to roll a sheet into the form of a pipe having a spiral seam, the rolling surface of each of said rollers having a depression therein for relieving the pressure exerted upon said sheet at predetermined intervals, the depressions on all of said rollers being so disposed that the pressure is relieved at all of said rollers at the same time, and means for feeding said sheet longitudinally of the mandrel whenever the pressure on the sheet is relieved at the rollers, the distance by which said sheet is fed longitudinally being determined by the pitch angle of the seam and being proportional to the length of the seam in the portion of the pipe rolled in the preceding rolling operation.

3. In a machine for forming pipe, a mandrel, a plurality of rollers cooperating with said mandrel to roll a sheet into the form of a pipe having a spiral seam, the rolling surface of each of said rollers having a depression therein for relieving the pressure exerted upon said sheet at predetermined intervals, the depressions on all of said rollers being so disposed that the pressure is relieved at all of said rollers at the same time, and means for feeding said sheet longitudinally of the mandrel whenever the pressure on the sheet is relieved at the rollers, the distance by which said sheet is fed longitudinally being substantially equal to the length of the seam in the portion of the pipe rolled in the preceding rolling operation multiplied by the cosine of the pitch angle.

4. In a machine for forming spiral pipe from a substantially flat continuous sheet of material, a plurality of rollers, means for guiding said sheet between certain ones of said rollers with certain edges of said sheet at a constant angle of inclination with respect to the axes of rotation of said rollers, and means for alternately feeding said sheet in a direction at right angles to the axes of the rollers and in a direction parallel with the axes.

5. In a machine for forming spiral pipe from a substantially flat sheet of material, a plurality of rollers, means for guiding said sheet between certain ones of said rollers with certain edges of said sheet making a constant angle with the axes of rotation of said rollers, means for feeding said sheet first in a direction at right angles to the axes of the rollers and then in a direction parallel with the axes alternately, a supporting roller for supporting the spiral form as it passes longitudinally from the forming rollers, and means for rotating said supporting roller frictionally against the surface of the spiral form in a direction which tends to tighten the turns of the spiral.

6. In apparatus for forming pipe having a spiral seam from a sheet, a mandrel, means for engaging the sheet and pressing the same about said mandrel to a spiral shape; said means disengaging the sheet and relieving the pressure thereon at predetermined intervals, and means for moving said sheet in the direction of the axis of the pipe formed while the pressure on the sheet is relieved.

7. In apparatus for forming pipe having a spiral seam from a continuous sheet, a mandrel, means for engaging successive portions of the sheet and pressing the same about said mandrel to a spiral shape with the longitudinal edges of the successive portions in proximity between successive turns; said means disengaging said portions and relieving the pressure thereon at predetermined intervals, and means for moving said sheet in the direction of the axis of the pipe formed while pressure on said portions is relieved.

8. The method of forming a cylindrical body from a sheet which comprises intermittently confining successive portions of said sheet to form partial spirals having a common axis releasing the confined portions of said sheet and moving said sheet while released in a direction parallel to said common axis between successive shaping operations.

9. The method of forming a cylindrical body from a sheet which comprises intermittently confining successive portions of said sheet to form partial spirals having a common axis and alternately moving the sheet in a direction parallel to said common axis, the confining operation being interrupted during said parallel movement of the sheet and the parallel movement of the sheet being interrupted during the confining operation.

10. In apparatus for forming spiral pipe, a mandrel, a roller adapted alternately to engage and disengage the material of which the pipe is to be made for alternately pressing the material about said mandrel and freeing the material; said roller having a rolling surface which is interrupted by a plurality of spaced depressions extending longitudinally of the roller and which clear the material.

11. In apparatus for forming pipe having a spiral seam from a sheet, a mandrel, means for recurrently pressing the sheet about said mandrel to a spiral shape and for freeing the sheet, and means for recurrently advancing the sheet in a direction parallel to the axis of said mandrel during intervals when the sheet is free.

12. In apparatus for forming a pipe having a spiral seam from a sheet, a mandrel, a plurality of rollers adapted to engage said sheet and to press the same about said mandrel to a spiral shape, means for driving said rollers; said rollers being so formed as to recurrently release said sheet, and means operating intermittently with respect to the movement of said rollers and when the sheet is released for advancing the sheet in a direction parallel to the axis of said mandrel.

13. In apparatus for forming pipe having a spiral seam from a sheet, a shaping tool, means for recurrently pressing the sheet about said tool to a spiral shape and for freeing the sheet, and means for recurrently advancing the sheet generally toward the axis of the pipe being formed during intervals when the sheet is free.

14. The method of forming a cylindrical body from a sheet which comprises successively confining a portion of said sheet to form a partial spiral, releasing the confined portion of said sheet when formed, and advancing said sheet while released in a direction parallel to the axis of the spiral.

BRUNO W. HENNING.